United States Patent
Eichstetter (10) Patent No.: US 11,332,976 B2
(45) Date of Patent: May 17, 2022

(54) DOOR WITH AN INTELLIGENT DOOR LEAF, WHICH HAS AN ELECTRICALLY SELF-SUFFICIENT DOOR LEAF MEANS, AND METHOD THEREFOR

(71) Applicant: EFAFLEX TOR—UND SICHERHEITSSYSTEME GMBH & CO. KG, Bruckberg (DE)

(72) Inventor: Karl Eichstetter, Tiefenbach (DE)

(73) Assignee: EFAFLEX TOR—UND SICHERHEITSSYSTEME GMBH & CO. KG, Bruckberg (DE)

( * ) Notice: Subject to any disclaimer, the term of this patent is extended or adjusted under 35 U.S.C. 154(b) by 312 days.

(21) Appl. No.: 16/483,569

(22) PCT Filed: Jan. 11, 2018

(86) PCT No.: PCT/EP2018/050683
§ 371 (c)(1),
(2) Date: Aug. 5, 2019

(87) PCT Pub. No.: WO2018/145852
PCT Pub. Date: Aug. 16, 2018

(65) Prior Publication Data
US 2020/0024898 A1    Jan. 23, 2020

(30) Foreign Application Priority Data
Feb. 9, 2017 (DE) .......................... 102017102599.5

(51) Int. Cl.
*E06B 9/82* (2006.01)
*E05F 15/77* (2015.01)
(Continued)

(52) U.S. Cl.
CPC ................ *E06B 9/82* (2013.01); *E05F 15/77* (2015.01); *E06B 9/11* (2013.01); *E06B 9/68* (2013.01);
(Continued)

(58) Field of Classification Search
CPC ..... E06B 9/82; E06B 9/11; E06B 9/13; E06B 9/68; E06B 2009/6836; E06B 2009/801;
(Continued)

(56) References Cited

U.S. PATENT DOCUMENTS 6,346,889 B1 *   2/2002   Moss ..................... G08B 13/08
340/545.1
7,119,681 B2 *   10/2006  Eskildsen ............. G08B 13/08
340/545.5
(Continued)

FOREIGN PATENT DOCUMENTS

CN    2488068 Y    4/2002
CN    1444800 A    9/2003
(Continued)

OTHER PUBLICATIONS

Notification of Reasons for Refusal dated Jul. 21, 2020, in connection with Japanese Patent Application No. 2019-539941, 7 pgs. English translation currently not available—to be provided.
(Continued)

*Primary Examiner* — Emily P Pham
(74) *Attorney, Agent, or Firm* — Chiesa Shahinian & Giantomasi PC (57) ABSTRACT

A door, in particular a high-speed industrial door, with an intelligent door leaf is disclosed. The door has a door leaf which is guided by lateral guides and covers a door opening, and which has a first and a second side, a driving means for moving the door leaf between an open and a closed position, a door control means for controlling the driving means, as
(Continued)

well as an electrically self-sufficient door leaf means arranged in the door leaf. The door control means also has a first communication unit. In addition, the door leaf device comprises at least one sensor unit for detecting at least a physical quantity, an energy converter which converts non-electrical energy into electrical energy, a second communication unit and at least one actuator unit. The first and second communication units communicate wirelessly with each other.

19 Claims, 3 Drawing Sheets

(51) Int. Cl.
    *E06B 9/11*         (2006.01)
    *E06B 9/68*         (2006.01)
    *H02N 2/00*        (2006.01)
    *H02N 3/00*        (2006.01)
    *H02P 11/00*       (2006.01)
    *E06B 9/80*         (2006.01)

(52) U.S. Cl.
    CPC .............. *H02N 2/00* (2013.01); *H02N 3/00* (2013.01); *H02P 11/00* (2013.01); *E06B 2009/6836* (2013.01); *E06B 2009/801* (2013.01)

(58) Field of Classification Search
    CPC ......... E06B 2009/6845; E05Y 2400/66; E05F 15/77; H02N 2/00; H02N 3/00; H02P 11/00
    See application file for complete search history.

(56) References Cited

U.S. PATENT DOCUMENTS

| | | |
|---|---|---|
| 2003/0143963 A1 | 7/2003 | Pistor et al. |
| 2004/0169487 A1 | 9/2004 | Akiwa |
| 2005/0253710 A1 | 11/2005 | Eskildsen |
| 2008/0231441 A1 | 9/2008 | Schafer |
| 2008/0231442 A1 | 9/2008 | Schafer et al. |
| 2010/0165686 A1 | 7/2010 | Matzberger et al. |
| 2010/0217558 A1 | 8/2010 | Tan et al. |
| 2011/0088328 A1 | 4/2011 | Schaff |
| 2013/0154439 A1 | 6/2013 | Lee et al. |
| 2015/0176321 A1 | 6/2015 | Rejc |
| 2016/0028329 A1 | 1/2016 | Webb et al. |

FOREIGN PATENT DOCUMENTS

| | | |
|---|---|---|
| CN | 101170271 A | 4/2008 |
| CN | 101641504 A | 2/2010 |
| CN | 202586475 U | 12/2012 |
| CN | 103449271 A | 12/2013 |
| CN | 203339923 U | 12/2013 |
| CN | 104261256 A | 1/2015 |
| CN | 204334097 U | 5/2015 |
| CN | 105840086 A | 8/2016 |
| CN | 205532205 U | 8/2016 |
| DE | 20001473 U1 | 6/2000 |
| DE | 20106777 U1 | 11/2001 |
| DE | 69615780 T2 | 8/2002 |
| DE | 10302812 A1 | 8/2004 |
| DE | 10302812 B4 | 10/2006 |
| DE | 202006020317 U1 | 8/2008 |
| DE | 202009009058 U1 | 10/2009 |
| DE | 102008046538 A1 | 3/2010 |
| DE | 202008013354 U1 | 4/2010 |
| DE | 202010009055 U1 | 9/2010 |
| DE | 102008064402 B4 | 3/2011 |
| DE | 102010028425 A1 | 5/2011 |
| DE | 202010016546 U1 | 5/2012 |
| DE | 102010062673 A1 | 6/2012 |
| DE | 102015000582 A1 | 3/2016 |
| EP | 1441101 A2 | 7/2004 |
| EP | 1972751 A2 | 9/2008 |
| EP | 2067922 A1 | 6/2009 |
| EP | 2887535 A1 | 6/2015 |
| EP | 3075944 A1 | 10/2016 |
| JP | S64-079664 A | 3/1989 |
| JP | 2003-120156 A | 4/2003 |
| JP | 2005-042315 A | 2/2005 |
| JP | 2005-312269 A | 11/2005 |
| JP | 2007-315069 A | 12/2007 |
| JP | 2008-270410 A | 11/2008 |
| JP | 2009-024392 A | 2/2009 |
| JP | 2009-511791 A | 3/2009 |
| JP | 2010-180696 A | 8/2010 |
| JP | 2011-032733 A | 2/2011 |
| JP | 2012-088008 A | 5/2012 |
| JP | 2015-137527 A | 7/2015 |
| WO | 2007045422 A1 | 4/2007 |
| WO | 2016022534 A2 | 2/2016 |
| WO | 2016037832 A1 | 3/2016 |

OTHER PUBLICATIONS

Notification of Reasons for Refusal dated Aug. 18, 2020, in connection with Japanese Patent Application No. 2019-539171, 13 pgs (including translation).

Office Action dated Mar. 3, 2020, in connection with Chinese Patent Application No. 201880006304.5, 16 pgs.

International Preliminary Report on Patentability dated Aug. 13, 2019, in connection with International Patent Application No. PCT/EP2018/050683, 9 pgs.

International Preliminary Report on Patentability dated Aug. 22, 2019, in connection with International Patent Application No. PCT/EP2018/050283, 8 pgs.

English translation of previously cited Notification of Reasons for Refusal dated Jul. 21, 2020, in connection with Japanese Patent Application No. 2019-539941, 9 pgs.

Office Action dated Apr. 21, 2020, in connection with Chinese Patent Application No. 201880006530.3, 22 pgs (including translation).

International Search Report and Written Opinion dated May 22, 2018, in connection with International Patent Application No. PCT/EP2018/050683, 17 pgs.

International Search Report and Written Opinion dated May 24, 2018, in connection with International Patent Application No. PCT/EP2018/050283, 15 pgs.

B. Cavallier et al., "Energy harvesting using vibrating structures excited by shock," 2005 IEEE International Ultrasonics Symposium vol. 1-4, Sep. 18-21, 2005, pp. 943-945.

Notification of Reasons for Refusal dated Apr. 20, 2021, in connection with Japanese Patent Application No. 2019-539171, 14 pgs. (including translation).

Examination Report No. 1 dated Mar. 18, 2020, in connection with Australian Patent Application No. 2018217585, filed Jan. 5, 2018, 6 pgs.

Examination Report No. 1 dated Apr. 1, 2020, in connection with Australian Patent Application No. 2018219550, filed Jan. 11, 2018, 3 pgs.

Decision of Rejection dated Sep. 18, 2021, in connection with Chinese Patent Application No. 201880006304.5, 15 pgs. (including translation).

Communication pursuant to Rule 71(3) EPC dated Nov. 4, 2021, in connection with European Patent Application No. 18703895.5, 62 pgs. (including translation).

Non-Final Rejection dated Nov. 29, 2021, in connection with U.S. Appl. No. 16/483,577, filed Aug. 5, 2019, 16 pgs.

\* cited by examiner

DOOR WITH AN INTELLIGENT DOOR LEAF, WHICH HAS AN ELECTRICALLY SELF-SUFFICIENT DOOR LEAF MEANS, AND METHOD THEREFOR

CROSS-REFERENCE TO RELATED APPLICATIONS

This application is a national stage under 35 U.S.C. 371 of International Patent Application No. PCT/EP2018/050683, filed Jan. 11, 2018, which claims priority to German Patent Application No. 102017102599.5, filed Feb. 9, 2017, the disclosures of which are incorporated herein by reference in their entirety.

TECHNICAL FIELD

The invention refers to a door, in particular a high-speed industrial door, with a door leaf having an electrically self-sufficient electromechanical door leaf means, and a method for such a door.

BACKGROUND OF THE INVENTION

High-speed doors are well known in practice and have been tried and tested for a long time. They serve as closures for a wide variety of door openings in the private and commercial sectors. Industrial doors are often used to separate the interior and exterior of a building. Rolling and folding doors are also known as high-speed doors.

For example, the door leaf of a roller shutter (rolling door) is wound up in the course of an opening movement in the area of the door lintel or is guided contact-free in a round spiral or an elongated spiral in relation to the other winding layers. The latter design is used in particular for industrial purposes, as it achieves high speeds of movement with a long service life and reliability.

Such high-speed industrial doors have proven themselves as a reliable closure of highly frequented door openings. The door leaves of these industrial doors are moved with large strokes, often a few metres. Due to the frequently achieved high actuating speed of 3 m/s and more, it is usually possible to close such industrial doors between two successive passages of a forklift truck or the like and thus provide protection against weather influences, draughts or a loss of the air-conditioned atmosphere in a room. Such a door thus contributes to the realisation of an energy-efficient building.

In order to ensure a safe and comfortable operation of such industrial doors, a series of sensors can be provided. These sensors regularly serve to increase the operational safety of the door and/or to monitor the operating status of the door. For example, collision sensors, also known as crash sensors, are used at the lower end of the door leaf to detect a collision between the moving door leaf and a person or object. In the event of such a collision with an obstacle, protective measures must be taken regularly to protect a person and/or objects.

The power supply for such sensors is provided regularly by spiral or trailing cables, which age mechanically during regular operation, especially since the movement load is high. In addition, there is a risk of mechanical damage to these cables, and the protruding parts of the cable holders pose a certain risk of injury to persons near the high-speed door.

As an alternative to trailing cables, conventional energy chains are also used, which are installed in the door leaf. This means that these connections are invisible to the operator. However, energy chains also exhibit the problem of wear and mechanical ageing.

In addition, the use of cables and energy chains requires a high design effort. This is due to the high mechanical stress caused by the movement of the door leaf and, under certain circumstances, by the operating conditions of the door, which is associated with corresponding costs. For example, when using the door for cold stores or car washes, very high quality cables or energy chains must be used. This is associated with a high space requirement, which is required for the bending radii of these cables and energy chains.

As an alternative to wiring, the DE 20 2008 013 354 U1 reveals a battery as a power supply for a sensor unit in the lowest slat of a roller shutter door leaf. Such a battery must be replaced in due time, which is why regular maintenance is required. Since only little space is available in the door leaf, the DE 20 2008 013 354 U1 uses a button cell with a very low overall height. This also means that the energy capacity of this battery is quite low, which is detrimental to short maintenance intervals.

In addition, batteries are often undesirable for safety reasons. For example, the doors must also function reliably in the event of a fire (in certain circumstances the door must remain closed or must open at the request of a control centre), which is not necessarily the case with pure battery operation.

Special batteries are therefore regularly used to ensure a longer service life and increased availability of a battery-operated door device. These special batteries are by no means everyday commodities and can often only be purchased through special channels. The transport of such batteries to the installation site is also subject to restrictive legal requirements. As a result, the use of special batteries in industrial doors leads to increased costs and an increased risk of use.

DE 200 01 473 U1 reveals an industrial door with a safety system for the protection of persons or objects at movable and/or driven doors. A signal transmission unit sitting on the door leaf is provided with an energy storage device in the form of a rechargeable battery, which is supplied externally via an inductive energy coupling device or an inductive energy transmission unit or alternatively via solar panels. The data transmission between the door and a door control device takes place via wireless data transmission.

The two possibilities for the power supply of an electrical device attached to the door, which are disclosed in DE 200 01 473 U1, extend the maintenance interval, but have the disadvantage of a high constructive expenditure and an increased error susceptibility. For the inductive supply of a device to the door leaf, an appropriate inductive transformer must be provided in the vicinity of the door, which generates a sufficiently strong magnetic field. With this "cable replacement" it is particularly disadvantageous that it is constructively complex and also transmission losses occur, which reduce the efficiency of this energy supply. In addition, inductive energy transmission can only take place regularly at a certain opening position of the door leaf, since an inductive transformer is limited in its range. Consequently, a reliable energy supply is not guaranteed if, for example, the door control is set up in such a way that the position at which the energy transfer can take place is not approached regularly or this position is only passed for a very short time.

The provision of a solar panel in accordance with DE 200 01 473 U1 on the door also carries the risk of contamination and damage to the panel, which means that this form of energy supply can also be unreliable. The door leaf and thus the sensitive solar panel are subjected to high mechanical stress. Similarly, in the event of a collision between a vehicle and the door leaf, for example, the fragile solar panel is exposed to the risk of damage. Furthermore, the position of the solar panel changes relative to the available light irradiation depending on the opening and closing state of the door, which leads to deteriorated operating conditions for the solar panel. It must be possible to reliably supply the electrical equipment of the door with little available solar energy even during the winter months and during night-time operation. This means that the energy for the door must be available regardless of the time of day or season when it is moved. This requirement is not met for solar panels. If, for example, the door is installed inside the building, no daylight is available at this point.

The solution approaches of DE 200 01 473 U1 lead to restrictions in the operation of the door and also to disadvantages in the reliability of the door. In addition, these solutions are associated with considerable costs.

SUMMARY OF THE INVENTION

It is the task of the invention to provide a door that allows a reliable and optimized operation of the same, and/or is cost-effective.

It is another task of the invention to provide a method for a door which can enable a reliable and optimized operation of the door.

These tasks are solved by the objects of independent claims. Further aspects and advantageous improvements are the subject of the dependent claims.

According to one aspect, a door, in particular a high-speed industrial door, is provided, which comprises: a door leaf which is guided in lateral guides and which covers a door opening and which has a first and a second side; and a driving means for moving the door leaf between an open and closed position; and a door control means for controlling the driving means, the door control means comprising a first communication unit; an electrically self-sufficient door leaf means which is arranged in the door leaf and has at least the following: at least one sensor unit for detecting at least one physical quantity; and an energy converter which converts non-electrical energy (such as mechanical or thermal energy) into electrical energy; and a second communication unit, wherein said first and second communication units can communicate with each other wirelessly; and at least one actuator unit.

A door in the sense of the invention is a device with a movable door leaf which covers a door opening.

Such a door serves, for example, as a hall closure or thermal separation in buildings (e.g. the separation between storage and cooling area).

A door according to the invention is, for example, a rolling or folding door in which the door leaf, which comprises a number of individual elements, is guided in laterally mounted guides. These individual elements of the door leaf, also known as slats or door frames, are connected to each other in a movable or angled manner.

In particular, the door may be a high-speed industrial door in which the door leaf is moved at high top speeds, at more than 1 m/s, preferably at more than 2 m/s or, in particular, at more than 3 m/s. This movement is effected by a driving means of the door, which for example has a powerful electric motor, a pneumatic lifting cylinder or a hydraulic system. In addition, the driving means can have other mechanical components, such as gears, belts or coupling elements.

The door is also equipped with a door control means which controls the door semi-automatically or fully automatically. Such a door control means usually has a microcomputer with control programs (software) which provide opening and closing operation as well as various operating and/or safety routines. Alternatively, the door control means can be provided hard-wired. In addition, an operating element, such as a pressure switch, may be provided at the door control means for manual opening of the door.

The door also has a door leaf means which is arranged in the door leaf, i.e. the door leaf means is integrated in the door leaf. The door leaf means is used for the acquisition/detection, further processing and communication/transmission of physical quantities which are to be taken into account by the door control means during operation of the door.

Thus the door leaf means has at least one sensor, for example a temperature sensor or an acceleration sensor, the detected physical quantity being transmitted to a first communication unit of the door control means as an operationally relevant parameter (i.e. as a parameter generally relevant for triggering a movement of the door leaf or the operation of the door) by means of a second communication unit of the door leaf means. In the simplest case, the first communication unit is a receiver unit for a radio signal, and the second communication unit is a complementary transmitter unit. Alternatively, the information can also be transmitted via infrared waves.

The communication unit (i.e. the at least one transmitting unit) of the door leaf means is preferably an (ultra) low-power radio unit, which is optimised for particularly low energy consumption. In particular, communication between the transmitting and receiving units can only take place as required. Communication can happen on the 433 MHz or 833 MHz band, for example. In particular, the transmitting unit can transmit the operationally relevant parameters independently if there is a corresponding transmission-triggering event (for example, transmission is carried out if a detected sensor value has exceeded a predetermined threshold value). Alternatively, the transmitter unit can transmit at regular intervals (for example, temperature measurements can be transmitted every 5 minutes).

For the purpose described above, the door leaf means is electrically self-sufficient and also configured without a battery. This eliminates the need for battery maintenance, for example, and externally mounted devices, such as a solar cell, can also be avoided. In addition, no cabling is required to supply power to the door leaf means, thus avoiding considerable mechanical effort and the risk of cable breaks. In a conventional solution, on the other hand, the cables used to power the door leaf means would have to be designed in such a way that they could also withstand the travel distances and acceleration forces of the door leaf, which can be a problem, especially with an industrial door This makes it possible to make the operation of the door more reliable and to optimise it. For example, the downtime of the door that would occur if the signal lines broke or if the battery was empty is reduced.

The energy converter is, according to the invention, a generator for electrical power or energy, whereby non-electrical forms of energy from the environment or the movement of the door leaf are converted into electrical energy, whereby electrical current is generated in the door leaf itself. In other words, the door leaf means creates the electrical energy required for its own operation itself. By using the energy converter, the door leaf means is electrically self-sufficient, i.e. no external electrical supply or additional electrical supply of the door leaf means is required (for example, no electrical or inductive supply is required as with DE 200 01 473 U1). Thus, the energy converted by the energy converter or "collected" from the environment is sufficient to operate the (electrical) consumers of the door leaf means alone.

Non-electrical energy is, for example, mechanical or thermal energy. The energy converter and the consumers in the door leaf means are further configured in such a way that a reliable power supply is guaranteed.

For this purpose, the electronic components in the door leaf means are preferably/optionally designed in such a way that they have very low power consumption and are preferably only energised when required. Such electronic components are, for example, available as "ultra-low-power" components.

Basically, industrial high-speed doors in particular have mechanical framework conditions that favour the use of a mechanical energy converter. For example, such doors regularly have quite high acceleration forces (regularly some G), so a mechanical energy converter with a high energy yield can be used.

Since the operating conditions for such doors are also known in advance, for example the acceleration values and travel distances of the door leaf and also the location are known, the door leaf means can be particularly well designed with the ingenious energy converter, which further increases the energy yield. For example, the existing mechanical energy conversion potentials per movement of the door leaf (also in relation to the energy consumption per movement of the door leaf) are precisely defined. Due to these favourable framework conditions, the entire door leaf means can be designed electrically self-sufficient.

For example, it can be experimentally determined that an electromechanical energy converter generates a certain amount of energy, for example 25 mWs, per stroke (i.e. per opening or closing movement) of the door. Accordingly, the consumers of the door leaf means can, for example, consume 12.5 mWs per stroke (=50% of 25 mWs), taking into account energy losses in the entire door leaf means. In the above example, if the sensor of the door leaf means is, for example, a collision sensor, the consumers of the door leaf means must be supplied with energy at the same time even when the door leaf is moving (especially after the initial acceleration of the door leaf). This temporal parity of energy conversion and energy demand can lead to an application-oriented and electrically self-sufficient energy supply of the door leaf means, which increases its reliability.

Also a battery or cable, which is cost-intensive and error-prone, is avoided—as already mentioned. The electrically self-sufficient supply of the consumers of the door leaf means by means of an energy converter thus reduces the probability of failure of this device. The non-use of a battery also takes into account the safety and environmental aspects described above, as no transport, disposal, maintenance or battery replacement is required.

Furthermore, no other additional device is required for the electrical power supply of the door leaf means at the door, e.g. an inductive transformer. The design of the door leaf means is compact and can therefore be integrated into the limited space available in the door leaf without having to make costly changes to the overall structure of the door leaf. In addition, such a device is maintenance-free or has a low maintenance need.

In summary, the inventive door leaf means is more reliable and more cost-effective.

By means of the way of the inventive power supply some applications for the door can be realized effectively. By means of at least one sensor unit of the door leaf means, operationally relevant ambient parameters of the door, such as the outside or inside temperature, can be acquired. Safety-critical parameters for collision prevention or -reaction of the door leaf, the position of the door leaf or a locking state can also be monitored specifically.

The information obtained from sensors can also be forwarded in an independent or intelligent way directly to at least one actuator unit, which converts this information. Alternatively, the information obtained from the sensors can also be evaluated by the arithmetic/computing unit, whereby the computing unit transmits control commands to the actuator unit according to predefined rules. The actuator unit can, for example, be a magnetic release, relay or a small electric servomotor. The possible applications are manifold, such as locking the door leaf, protection against unwanted movement, burglary protection or signalling the information detected by the sensors with the aid of display elements, for example with light emitting diodes (LEDs). For example, information can be recorded regarding mechanical interlocks arranged on the door leaf. These mechanical interlocks/locking mechanism can, for example, be operated by the operator with a key. Once the door has been locked, the motor must no longer be activated/energised. This information is recorded by the corresponding sensors and forwarded to the controller. This is an exemplary design of an intelligent door.

In accordance with the invention, the door leaf means comprises the energy converter, the sensor unit, the transmitter unit and preferably at least one actuator unit. With these functional individual components, an "intelligent" door leaf can be realised, which records operating parameters of the door leaf and independently converts them into reactions by means of at least one actuator, as well as transmitting them to the control unit, preferably by radio, and which is also electrically self-sufficient.

According to an improvement of the invention, the energy converter according to the invention converts mechanical energy, which is available due to the movement of the door leaf, into electrical energy and is an electromechanical device which can also work as a sensor unit.

This inventive electromechanical and electrically self-sufficient door leaf means thus has mechanical components which serve to convert non-electrical energy into electrical energy in the energy converter, as well as electrical or electronic components which serve for further processing and communication/transmission of the operationally relevant parameters recorded. Micro-electromechanical systems, also known as MEMS systems, can preferably be used for this purpose.

The energy converter in this improvement uses the mechanical energy generated during each closing and opening process of the door leaf and the associated acceleration processes. During a closing and opening process, the door leaf can perform a stroke of several metres at a top speed of 3 m/s, for example. The kinetics of the movement depends on the height of the door opening to be covered as well as the degree of opening and closing. A closing and opening process can affect the entire door opening, but can also only be carried out partially and does not have to open or close the door completely during every process. In any case, however, the door leaf is strongly accelerated by the driving means, i.e. first brought to top speed and then braked back to a standstill.

Since the energy converter is arranged in the door leaf means of the door leaf, the energy converter moves with the door leaf and is accelerated accordingly. Depending on the location of the door leaf means in the door leaf and the design of the guides of the door, the movement of the door leaf means can be essentially linear and/or follow a wrapping movement of the door leaf.

The energy converter, for example, can be designed as a linear generator. A mass in the energy converter is deflected in a straight line due to its inertia during acceleration and deceleration of the door leaf and due to the defined movement of the door. This deflection can result in electrical power, for example, by means of the induction principle or the piezoelectric principle.

For example, in a linear generator that works according to the induction principle, the mass is regularly a magnet, preferably a rare earth magnet with a high flux density. The mass or the magnet will move in one or more coils. The relative movement between mass and coil caused by the acceleration of the door generates a voltage by means of the induction effect. In the case of a linear generator, a simple estimation of the voltages that can in principle be generated when the magnet is moved according to the law of induction results:

$$U=-d\phi/dt=-N*A*dB/dt, \quad \text{(equation 1)}$$

wherein ø is the magnetic flux, A is the cross-sectional area of the coil, B is the magnetic induction, N is the number of turns of the induction coil, and dø/dt is the flux change in the coil. Short-term induced voltages of several volts can be achieved.

The energy generated can then be converted according to the following formulas:

$$E=L*I^2/2, \text{ with} \quad \text{(equation 2)}$$

$$L=\mu 0*N^2*A/l \quad \text{(equation 3)}$$

for an air-filled coil, where L is the inductance of the coil in Henry, µ0 is the magnetic field constant, A is the area of the coil, and l is the length of flux in the coil. Experiments show that with generously dimensioned coils and magnets short-term current flows of several 10 or 100 mA are possible. Consequently, for example, several 10 mWs can be generated per door stroke. The expert can also design the linear generator accordingly using the above formulas and some experiments.

By requiring the door leaf to follow its guides and to perform a precisely defined movement accordingly, the at least one degree of freedom f or the intended movement possibilities of the mass and/or magnet can be defined in such a way that it coincides with at least one of the essential acceleration directions of the door leaf in order for the energy converter to be particularly effective.

Preferably, a mass is suspended from at least one spring so that it can vibrate, has a degree of freedom of f=1 (a degree of freedom of translation), and can be moved back and forth along a straight line accordingly.

For example, if the door leaf moves in a straight line upwards or downwards in its guide, the energy converter with the magnet is arranged in such a way that the magnet in the door leaf can move upwards or downwards when the door leaf is opened or closed.

The magnet can, for example, be arranged in a translatable linear guide.

As an alternative to the suspension on a spring, the magnet can also be mounted between two hydraulic or mechanical shock absorbers and move freely and in a straight line back and forth between them.

In particular, the mass and its suspension can also be adapted to the known kinetics of the movement of the door leaf in such a way that the efficiency of the energy converter is optimised. For example, the spring constant(s) and the mass in the linear generator described above can be designed in such a way that the mass is deflected just within the ideal working range of the coil during normal acceleration of the door leaf, whereby preferably the translation of the mass is as large as the length of the coil.

Since industrial doors reach high top speeds and are subject to correspondingly high accelerations during closing and opening and the door leaf, which lead to a deflection of a mass, the conversion of mechanical energy into electrical energy results in a good energy yield, in the present example of kinetic energy. Each time the door leaf is moved, electrical energy is thus generated for the intended consumers, who also need this energy regularly when the door is moving. Even after a long service life of the door leaf, energy is available when the door is used, namely through the initial acceleration of the door leaf. In this respect, the electrical energy is made available according to the respective demand.

A battery cannot permanently meet this requirement due to its self-discharge. The invented energy converter, which uses the mechanical energy of the door leaf to generate electrical energy, thus increases the reliability of operation.

According to an improvement of the invention, the aforementioned energy converter has a mechanical energy storage element, preferably a spring with a defined spring constant, and a vibratory mass attached to it, whereby the (jerky) acceleration movements of the door leaf during operation or movement of the door leaf, for example during opening or closing, cause the energy storage element to oscillate (in a damped manner).

A mechanical energy storage element is, according to its invention, an element which can store the mechanical energy generated by the movement of the door leaf and often only available for a short time beyond the process of movement and subsequently make it available for a longer period. The duration of the energy conversion from mechanical to electrical energy can thus be extended by the storage element, which improves the efficiency of the energy conversion.

The use of an energy converter for the conversion of mechanical into electrical energy is thus additionally promoted by the energy storage element.

Energy storage elements such as springs, compressed air reservoirs or flywheels can be used. Due to the mostly straight-line acceleration movement of the door, an elastic spring is advantageous as an energy storage element, as it can be arranged in accordance with its direction of deflection. For example, linear springs as well as bending or torsion springs can be used as springs.

At acceleration for example, elastic spring is deflected by inertia of masses attached to elastic spring. The spring force counteracts the deflection of the mass and sets the mass into a damped oscillating oscillation, which can be used to generate energy, which can continue even if the door leaf is no longer accelerated. For example, the mass undergoes a brief acceleration twice each time through an opening or closing process. If the spring constant is now designed so that each of these movements is sufficient to set the mass into a longer oscillating oscillation, this increases the duration of the energy conversion process.

According to an improvement of the invention, the energy converter can be set up in such a way that it is based on the induction principle or the piezoelectric principle.

In electromagnetic induction, an electrical voltage is generated when the magnetic flux density changes, as explained in more detail above. For example, a moving magnet can be used. Alternatively, the magnet can also be stationary while the conductor or coil is moving.

Consequently, the energy converter is a self-contained, compact system for generating electrical energy. Since the energy converter is only dependent on the movement or acceleration of the door leaf and no other environmental parameters, the energy converter can be installed in the door leaf independently of other devices. Due to the guidance of the door leaf and the type of drive of the door leaf, the mechanical framework conditions for the use of an electro-mechanical energy converter are also precisely known, which is why the design of the energy converter can be optimized for this purpose.

Other auxiliary devices outside the door leaf, such as an external induction coil for electrical energy coupling, are also avoided. Such an energy converter according to the induction principle can be realized compactly, robustly and with high efficiency. The reliability of the door leaf means is also increased.

Alternatively, the energy converter can operate according to the piezoelectric principle. A suitable piezoelectric element can be, for example, a common elastic flexural resonator in the form of an elongated platelet, which is suspended at one end (tongue-like) and which has a mass at its other free end. When the mass is accelerated, the flexural resonator is set to oscillate.

The compact design of the energy converter is also particularly advantageous for the piezoelectric element, since the energy converter generates electrical energy independently of environmental parameters other than the movement of the door leaf.

According to an improvement of the invention, the energy converter is a linear generator and a degree of freedom of the mass of the energy converter is one (f=1). The degree of freedom of the mass is provided in such a way that it corresponds to the essential directions of acceleration of an end element of the door leaf.

According to an improvement of the invention, the energy converter described above can be a thermo/voltage converter. Such a thermo/voltage converter is a thermoelectric generator that can convert a temperature difference into electrical energy. The thermoelectric generator is based on the Seebeck effect, or the reversed Peltier effect, in which a temperature difference leads to a voltage at two electrodes which are arranged on opposite sides of a preferably plate-shaped element. For example, Peltier-like elements are mounted between the first and the second side of the door leaf in a lamella. Semiconductor materials such as $Bi_2Te_3$, $PbTe$, $SiGe$, $BiSb$ or $FeSi_2$ can be used as materials here.

The efficiency of such a thermoelectric generator (or element) can be defined as the ratio of the electrical power output to the thermal energy supplied. The efficiency depends on the material properties. This is described by the so-called thermoelectric effectiveness Z. It means that a material has advantageous thermoelectric conversion properties if the product of Seebeck coefficient and electrical conductivity is high and the thermal conductivity low at the same time.

The so-called ZT value, which considers the material properties with regard to the temperature boundary conditions, is essential for the size of the efficiency. The efficiency increases with increasing ZT value and aims at a limit value defined by the Carnot efficiency at infinitely high ZT. Preferably, the invention thermoelectric generator has a ZT value greater than 1.2, preferably greater than 1.5.

The invented thermal/voltage converter is arranged so that it uses the temperature difference between the first and second sides of the door leaf to generate electrical energy, the first side being the inside side of the door leaf and the second side being the outside side of the building. A common individual element of the door leaf consists of a metallic material, for example aluminium, and is a rectangular hollow profile. Therefore, the thermal/voltage converter may be arranged inside the cavity of the single element of the door leaf with its thermally active surfaces (i.e., between a heat source and a heat sink) such that one surface is thermally conductively connected to the corresponding first inner surface of the door leaf and the other surface is thermally conductively connected to the second inner surface of the door leaf opposite the first inner surface. The first inner surface of the hollow profile is preferably arranged towards the outside of the building and the second inner surface of the hollow profile towards the inside of the building or vice versa, as this is where the largest temperature difference prevails, which improves the energy conversion efficiency of the energy converter. Thus, the usual installation position of a door according to the invention is used advantageously as a building closure or alternatively also as a separation from a cold store in order to be able to provide sufficient power for possible permanent consumers in the door leaf equipment by means of a thermo/voltage converter, since the average energy generation values of the energy converter (averaged over longer periods of time) can be estimated in advance.

The door leaf means can also have at least one sensor unit. This allows for an "intelligent" door control system to be implemented, whereby the door or the door control means and/or the door leaf means can react intelligently to the respective environmental and/or operating conditions. For example, examples of further improvements on intelligent door control are explained into more detail below.

According to an improvement of the invention, the door leaf can have a closing or end element, whereby the sensor unit has a collision sensor, which is arranged in the end element.

An end/closing element in accordance with the invention is formed at the end of the door leaf which is closest to the ground in the closed position. This can, for example, be the lowest (or last) lamella of the door leaf, the so-called end plate/shield. This end element is often designed with a cavity. According to the invention, a collision sensor can be arranged in such a cavity of the end element.

Such collision sensors can determine whether the door leaf has experienced a collision, i.e. whether the door leaf has been "crashed". The consequences of such a collision can be that persons and/or objects must be protected. However, collision sensors can also detect impending collisions (e.g. in a capacitive manner) and thus help to prevent collisions.

This leads to lower off- and downtimes of the door and thus to optimized operation.

According to an improvement of the invention, the collision sensor will detect whether the door leaf had a collision with an obstacle. In the event of a collision, the door leaf means then transmits the information about the collision to the door control means, enabling the door control means to react appropriately.

According to an improvement of the invention, the door leaf can have a mechanical or electrical interlock and the sensor unit can have a locking sensor that detects the locking state of the mechanical or electrical interlock/locking.

The door leaf can switch between an unlocked state and a locked state. The locking can be done manually by one person with the help of a key or electrically. After the door leaf has been locked, it is usually no longer possible to control the drive device of the door leaf. The interlock protects the room separated by the door from unauthorized access.

An interlock sensor/locking sensor can detect the state of the mechanical interlock. The acquisition/detection is possible via a series of signals, such as optical or piezoelectric signals. The reliable function of the locking sensor must be available in all situations. In emergency situations, such as a fire, the reliable functioning of the locking sensor is safety relevant.

The locking sensor is designed as part of the electrically self-sufficient door leaf means. Thus, the supply of the locking sensor is independent of an external supply. This independent supply by the energy converter in the door leaf means itself avoids external sources of error such as cable breaks or manipulation. Due to the special characteristics of the energy converter and the electrically self-sufficient operation of the door ball device, power supply failures, such as those occurring with empty batteries, can also be ruled out. This improves the reliability of the door.

According to an improvement of the invention, the sensor unit can have temperature sensors that detect the temperature difference between the first and the second side of the door leaf, and/or external temperature sensors and/or acceleration sensors to detect the direction of movement of the door and its acceleration.

For example, components that change their resistance according to temperature changes can be used as temperature sensors. Examples of such temperature sensors are a thermistor or a PT100 sensor. The lamellas used for industrial doors are often thermally insulated. This makes it easy to measure the temperature on the opposite metal sides within a lamella. Since metal regularly conducts heat well, the ambient temperatures can be accurately measured. If the temperatures are recorded in a lamella on the outward side and in a lamella on the inward side, a temperature difference between the first and second sides of the door leaf can be calculated from this. This allows conclusions to be drawn, for example, about the quality of the thermal insulation provided by the door or about its state of opening. Depending on the temperature difference, the door control can draw conclusions about the actual opening status and thus the door control can execute corresponding program routines. For example, the door controller can detect that the positioning system has "miscounted" or is incorrectly positioned if the temperature difference is too small, i.e. the door is open although it should be completely closed. In this case, appropriate countermeasures can be initiated, e.g. appropriate instructions to the maintenance personnel.

Alternatively, the temperature can be measured on only one side of the door leaf. For example, at least one outdoor temperature sensor can be provided on the outside side of the slat for detecting the outdoor temperature(s).

An acceleration sensor can also be arranged on the door leaf means in addition to or as an alternative to the temperature sensors mentioned above. The acceleration sensor detects an acceleration of the door leaf and can thus track the movement of the door leaf. Acceleration is usually detected with the aid of a test mass. Depending on the inertia force acting on the test mass, the acceleration can be calculated. For example, a dynamic pressure fluctuation generated by the inertial force of the test mass can be caused by piezoceramic sensor plates, which convert the pressure fluctuation into electrical signals. In addition, strain gages and acceleration sensors without test mass, such as a Ferraris sensor, can also be used. The acceleration of the door leaf is an indicator of the overall condition of the door, for example the condition of the rollers of a roller shutter, and can be evaluated to detect signs of wear on the door. In detail, the acceleration achieved by the door leaf and sensed by the sensors allows conclusions to be drawn about the overall condition of the door. The reason for a too low acceleration value could be a damaged door that has been insufficiently repaired. The rolling mechanism of a roller shutter could also be damaged, causing the door leaf to jam. A consumption of lubricants in the lateral guides is also conceivable, which leads to greater resistance to the movement of the door leaf and consequently to grinding of the door leaf.

All of the sensors mentioned above can be arranged in the door leaf means itself. This compact design not only saves space, but the installation of the temperature sensors and the acceleration sensor within a lamella also protects them from external forces. The function of the sensors can thus be reliably guaranteed.

According to an improvement of the invention, the temperature difference measured by the temperature sensors can be transmitted from the door leaf means to the door control means, which thus evaluates the tightness of the door or the quality of the closure of the building by the door.

The temperature sensors arranged on opposite sides of a slat, for example, can reliably measure the ambient temperature on two sides of the door leaf through the thermally separated slats. The detected temperatures can be transmitted to the receiving unit of the door control means via communication/transmission between the transmitting unit of the door leaf means and the receiving unit of the door control means. The temperature values can then be processed at the door control means and a temperature difference can be calculated. On the basis of this temperature difference, the door control means can draw conclusions about the tightness of the door.

For example, the temperature difference can be compared with at least one static or dynamic (e.g. seasonal) threshold value. If the value falls below the threshold value and the door is closed, it can be assumed that the door is leaking. Conversely, for example, by comparing it with the threshold value, it can be determined that the door leaf is actually not completely closed, although this should be the case. This provides an additional parameter for monitoring the operation of the door With the help of this check of the closed state of the door, energy losses, which occur, for example, as heat losses in winter, can be avoided. By evaluating such temperature sensors, unnecessary costs can be avoided.

According to the invention, the outdoor temperature measured by the outdoor temperature sensor can be transmitted through the door leaf means to the door control means, which switches between summer and winter operation by comparing the preset threshold value with the measured outdoor temperature, whereby the door is not completely closed in summer operation.

Thus, conclusions about the season can be drawn from the measured outside temperature. For example, the change in outdoor temperature is stored over a longer period of time, for example several months, in order to reliably determine the current time of year independently of measured peak values. If, for example, it is determined that summer operation has taken place, the door control means can automatically cause the door leaf not to close completely. Ventilation inside a hall can be supported by a door leaf that is not completely closed. This can improve working conditions inside the hall and reduce ventilation costs. Such a door can therefore make the distinction between summer and winter operation independently: operator intervention to switch the operating modes is therefore not necessary.

Such a door can make the distinction between summer and winter operation independently, whereby manual operator intervention becomes unnecessary. This saves manpower resources and allows not only cost-saving operation, but also immediate control of the door leaf opening depending on outside temperatures.

According to an improvement of the invention, the values measured by the acceleration sensor can be transmitted through the door leaf means to the door control means, whereby the door control means assesses whether the door is damaged or worn by comparing the acceleration values with at least one preset first acceleration threshold value.

The acceleration achieved by the door leaf and sensed by the sensors thus allows conclusions to be drawn about the overall condition of the door. The reason for a too low acceleration value could be a damaged door that has been insufficiently repaired. The rolling mechanism of a roller shutter could also be damaged, causing the door leaf to jam. A consumption of lubricants in the lateral guides is also conceivable, which leads to greater resistance to the movement of the door leaf and consequently to grinding of the door leaf.

If such damage or wear of the door can be detected, appropriate countermeasures can be initiated. For example, maintenance instructions can be output by the door control means. This can prevent further damage to the door leaf, which would lead to longer service life of the door leaf.

According to an improvement of the invention, the values measured by the acceleration sensor can be transmitted to the door control means by the door leaf means, whereby the door control means assesses whether invalid user settings have been made by comparing the acceleration values with at least one preset second acceleration threshold value.

By comparing the measured acceleration value with a second preset acceleration value, the speed setting of the maximum permissible door leaf speed can be checked, for example. This comparison makes it possible to identify such inadmissible speed settings, which can, for example, lead to drive belts skipping, thus posing a safety risk.

The preset second acceleration value can be determined/calculated beforehand by experiments or simulations under consideration of safety factors.

Too high speeds of the door leaf also affect the service life of the door. Accordingly, too hard braking rates or too fast braking processes lead to increased wear of the components. By recording the current acceleration and comparing it with a preset second acceleration threshold, the door's probability of failure can be reduced and optimized operation of the door can be ensured.

According to an improvement of the invention, the values measured by the acceleration sensor can be transmitted to the door control means by the door leaf means, whereby the door control means assesses whether the door crashes or not by comparing the acceleration values with at least one preset third acceleration threshold value.

Due to a failure of a safety element or an incorrect control input, it can happen that the door falls down uncontrolled. Such a crash represents a danger for objects, but especially for people. A crash of the door leaf can be detected by comparing the acceleration detected by the acceleration sensor with a preset third acceleration threshold value.

If a crash of the door leaf is detected, further countermeasures can be initiated. For example, an EMERGENCY-STOP mechanism can be triggered. For example, the door control means causes the driving means to stop the movement of the door leaf immediately and maintain the current position. This type of fall protection can prevent accidents to persons and objects.

However, the door control means can also act autonomously or independently, for example by means of an actuator unit inside the end shield or, in an emergency, by emergency braking or the EMERGENCY-STOP of the door leaf. This emergency deceleration could be achieved by means of mechanically pretensioned bolts with springs, which in an emergency intervene in the frames by unlocking them, causing the door leaf to lock into place and stop immediately. These bolts are preferably mounted on both sides of the door leaf adjacent to the door leaf guides.

According to a further improvement of the invention, the door may further comprise an energy storage unit for storing electrical energy generated by the energy converter; and/or an energy management unit for managing energy generated by the energy converter; and/or a arithmetic/computing unit, the arithmetic/computing unit optionally comprising a signal processing unit; and/or preferably at least one actuator unit.

A storage element in the sense of the invention stores the electrical energy generated by the energy converter so that it is also available in phases in which the energy converter does not convert any energy. Electrochemical capacitors such as supercapacitors, also known as "gold caps", can be used as storage elements.

An energy management unit according to the invention manages the energy generated by the energy converter in such a way that the storage element is charged with the generated electrical energy from the energy converter according to demand and state of charge. Accordingly, the energy management unit can switch consumers on or off.

A computing/arithmetic unit of the door leaf means of the invention converts the physical quantities recorded by sensors into operation-relevant parameters. For example, the resistance of a PT100 temperature sensor or the measured voltage difference is converted into a temperature with the unit "degree Celsius". With regard to an acceleration sensor, for example, the processing unit can only filter out the peak value of the acceleration and transmit it to the door control unit in order to save energy.

According to an improvement of the invention, the door leaf means, consisting of the components of the energy converter, the energy management unit, the energy storage unit, the computing unit, the sensor unit and the optional at least one actuator unit, can form an energetically self-sufficient system unit, whereby the converted and stored energy is used to operate these components without the need for an external energy supply. This system unit may preferably have an independent control loop or reaction system which operates independently of other components outside the door leaf.

According to an improvement of the invention, the door leaf means with at least one actuator unit can perform an action on information obtained from the sensors even without interaction with the drive unit (i.e., independently). The at least one actuator unit can, for example, form an LED display, a magnetic release, or a small electric servomotor. The independence from external influences is increased by this energetically self-sufficient and independently acting device, whereby the influence of external interference influences on the executability of certain actions achieved by at least one actuator unit is minimized and thus the reliability and safety of the system is increased. For example, radio interference becomes insignificant and reaction times becomes shorter.

According to an improvement of the invention, the door leaf means can form an integrated assembly and/or the door leaf means can be arranged in an end element of the door leaf.

According to the invention, the integrated assembly consists of at least one sensor unit, the energy converter and a second transmitting and receiving unit or at least one actuator unit. Due to an integrated structure of these elements, the door leaf means forms a compact system assembly. By the integrated arrangement of at least these three or at least four elements the door leaf means can function electrically self-sufficient. This means that only short transmission paths or cable lengths are required in the door leaf, which can reduce the susceptibility of the door leaf means to errors.

In addition, the above self-sufficient and autonomous unit can detect a crashing door leaf and initiate appropriate EMERGENCY-STOP sequences. This can preferably be achieved by activating, for example, mechanically pre-tensioned bolts, which are directly and autonomously unlocked by the door leaf means and thus prevent or stop the door leaf from falling.

Furthermore, the entire door leaf means can also be arranged in an end element of the door leaf, i.e. where, for example, the collision sensors are also arranged.

According to an improvement of the invention, the door control means may be stationary and/or the first communication unit may comprise a first transmitting and receiving unit; and the second communication unit may comprise a second transmitting and receiving unit.

According to an improvement of the invention, the door leaf means can transmit the locking state of the mechanical or electrical interlock to the door control means.

Based on the transmitted information about the mechanical locking status, the door control means can control the driving means to move the door leaf. If, for example, the second transmitting and receiving unit transmits a signal that the door leaf is mechanically or electrically locked (e.g. by means of a toggle switch on the door), the driving means can be put into an idle state. This means that the driving means does not become active if the door is mechanically locked.

According to another aspect of the invention, a method is provided for a door, in particular a high-speed industrial door, which comprises converting non-electrical energy into electrical energy by means of an energy converter of a door leaf means arranged in a door leaf of the door; storing the electrical energy in a storage element of the door leaf means; detecting at least one physical quantity by a sensor unit of the door leaf means based on the stored electrical energy; and transmitting the detected physical quantity by a transmitting unit of the door leaf means to a (preferably stationary) door control means, which is provided for controlling the driving means of the door.

The energy converter arranged in the door leaf means converts freely available energy from the environment as non-electrical energy into electrical energy. Since the energy converter is arranged in the door leaf, it can, for example, use the kinetic energy of the door leaf or a temperature difference between a first and a second side of the door leaf.

A storage element also arranged in the door leaf means then stores the electrical energy generated by the energy converter. The storage element is located in the immediate vicinity of the energy converter.

Since the energy converter, the storage element, the sensor unit and the transmitter and receiver unit are elements of the door leaf means, they are arranged adjacent to each other. Thus, the individual steps of the process take place in structurally arranged elements. This results in a synergy between process and arrangement. The process realises the same advantages as described above in relation to the door.

According to an improvement of the invention, the physical quantity measured is at least a temperature at the door leaf and/or an acceleration of the door leaf and/or a position of a mechanical element which provides information on the locking state of the door.

The physical quantity recorded is a quantity that provides information about the state of the door. It helps to check safety critical or function relevant parameters of the door, which are necessary for a reliable and optimized and finally cost saving operation, as described above with regard to the corresponding equipment at the door.

According to another aspect of the invention, the use of an energy converter to convert non-electrical energy into electrical energy to power a door leaf means located in a door leaf of a door with a sensor unit for sensing at least one physical quantity is disclosed.

A door has been described above which has an intelligent and electrically completely self-sufficient door leaf means. This eliminates the need for an external power supply to the door leaf means, for example via cables.

The ingenious door leaf means allows to carry out advantageous sensory functions in a reliable way, which optimize or "intelligently" design the operation of the door.

According to another aspect of the invention, all the above-mentioned functions of the door leaf means and the door control means can also be carried out by means of an external power supply or by means of support from an external power supply, i.e. not energetically self-sufficient. For example, the door leaf means can have a battery, an inductive external power supply or a power supply via trailing cable.

According to this other aspect of the invention, a door, in particular a high-speed industrial door, is provided, comprising a door leaf which is guided in lateral guides and which covers a door opening and which has a first and a second side; and driving means for moving the door leaf between an opened and a closed position; and door control means for controlling the driving means, the door control means comprising a first communication unit; wherein the door leaf means is disposed in the door leaf; and at least one actuator unit, the door leaf means comprising the following: at least one sensor unit for detecting at least one physical quantity; and an at least partially external power supply; and a second communication unit, said first and second communication units communicating wirelessly with each other. The door control means and/or the door leaf means contain at least one functionality (see, for example, the above explanations) which implements an intelligent door control.

At least one physical variable/quantity, which is/are further processed by the door control means and/or the door leaf means, is/are detected preferably by means of the at least one sensor unit, wherein this causes a corresponding reaction of the actuator unit and/or the door control means.

The door according to the invention will be explained in detail in the following examples by means of the figures in the drawing: It is shown.

BRIEF DESCRIPTION OF THE DRAWINGS

DETAILED DESCRIPTION OF THE INVENTION

Figure 1:
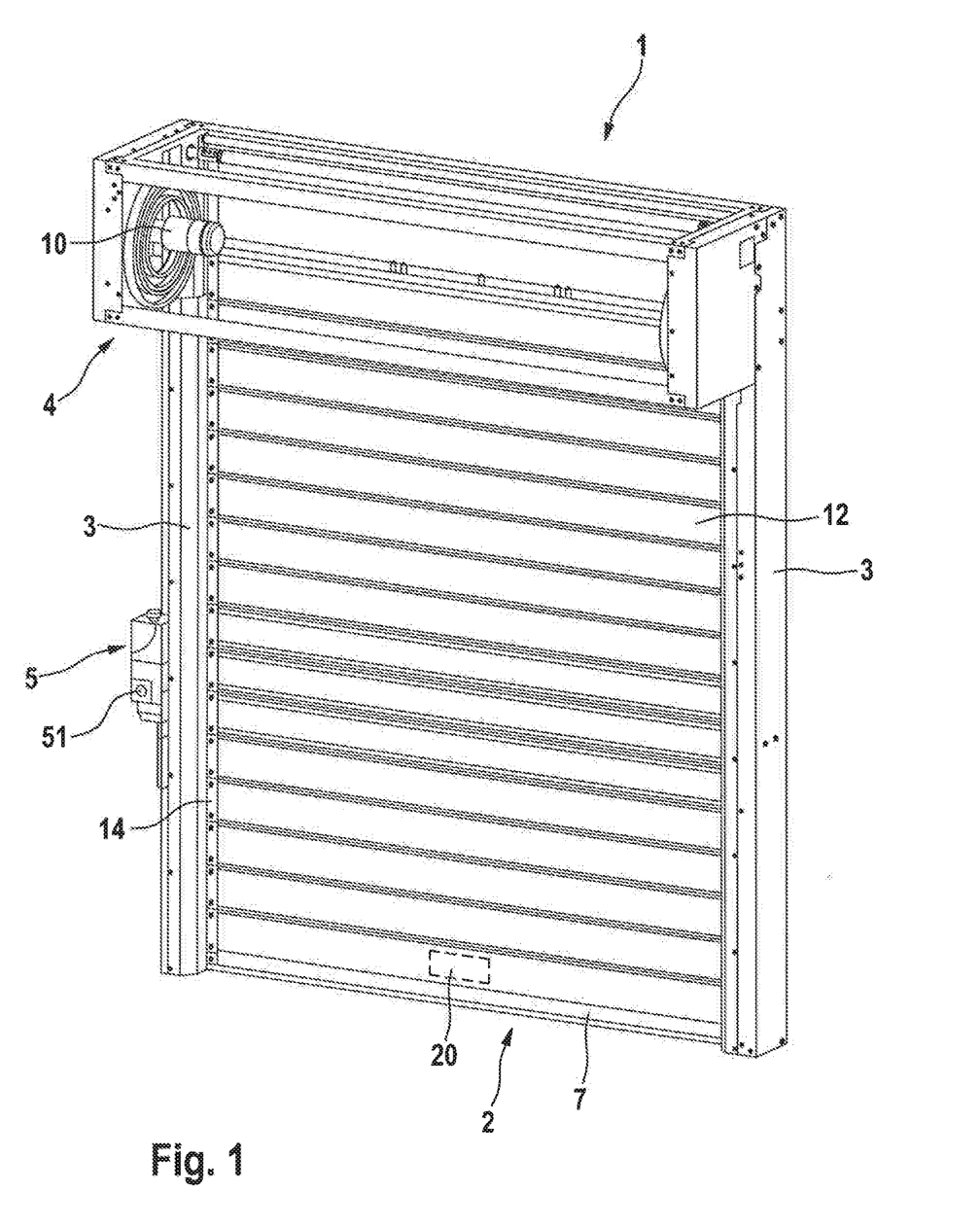
FIG. 1 A front view of a roller shutter 1 according to the invention.

FIG. 1 shows a front view of an invented roller shutter 1. As shown in FIG. 1, rolling door 1 has a door leaf 2 which is held in lateral guides 3 and comprises a plurality of slats 12 which extend perpendicularly to guides 3 over a door opening.

The door leaf 2 may also have hinge hinges 14, which comprise a plurality of hinge links. In each case two hinge members assigned to one another can be connected to one another by a stiffening profile extending transversely to the lateral guides 3 in such a way that the hinge bands 14 with the stiffening profiles form a stable, angled framework.

As an alternative to slats 12, the door leaf 2 can comprise segments, which can be guided in a rail system above door 1, for example on a ceiling, without being rolled up. The door leaf 2 can also be designed as a door curtain made of flexible PVC (polyvinyl chloride) with an end strip. If acrylic glass is used, the door leaf 2 can also be transparent. Since the door 1 can be designed as an internal or external door, door leaf 2 can also include windows or doors.

Furthermore, the door leaf 2 has an end element 7, which is provided with a rubber seal or the like on the floor side. The end element 7 and the hinge links can be swivelled coaxially to the swivel axes of the hinge links. A door leaf means 20 is located in the end element 7.

The door leaf 2 is driven by a motor 10 of the driving means 4 shown in FIG. 1, which transmits the motor power by means of a drive shaft in a manner known per se. The motor power is dimensioned in such a way that the roller shutter 1/rolling door 1 can open and close quickly (>1 m/s, preferably >2 m/s).

If the roller shutter 1 is in the closed state, the end element 7 is in contact with a bottom-side element of the roller shutter 1. In this condition, the thermal separating effect or the tightness of the roller shutter 1 is greatest, so that an air exchange between the first and the second side of the roller shutter 1 is largely or completely prevented. In the fully opened state, the maximum area of the door opening released by the roller shutter 1 is the maximum. However, roller shutter 1/rolling door 1 can also assume any other state between the closed and open state, according to the programming of the door control means 5. The door control means may have a control element or a control panel 51 by means of which a user can operate the door control means 5.

Figure 2:
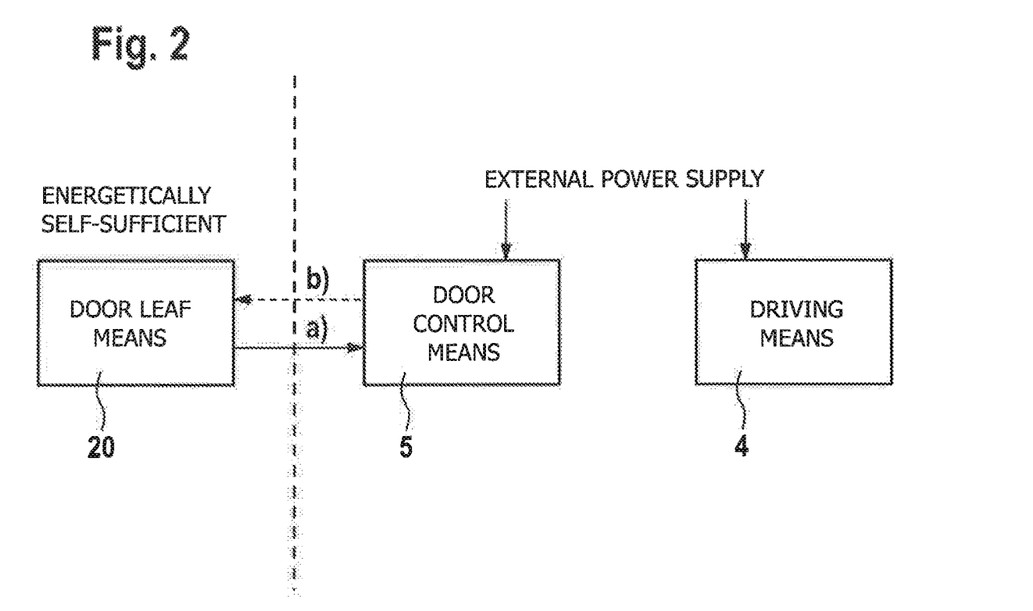
FIG. 2 a principle diagram of a control system for a door, having a door leaf means 20, a door control means 5, and a driving means 4.

FIG. 2 shows a principle diagram of a system consisting of the electric door leaf means 20, the door control means 5 and the driving means 4. The door leaf means 20 is arranged in the door leaf 2 as shown in FIG. 1.

The driving means 4 and the door control means 5 can be fixed and arranged adjacent to the door leaf 2. Communication between door leaf means 20, door control means 5 and driving means 4 can be bi- or unidirectional via radio. If the communication between door leaf means 20 and door control means 5 is unidirectional, represented by the arrow a) in FIG. 2, the door leaf means 20 is designed as a transmitting unit and the door control means 5 as a receiving unit. If the communication between door leaf means 20 and door control means 5 takes place bidirectionally, shown in FIG. 2 by the arrows a) and b), both the door leaf means 20 and the door control means 5 are designed as a transmitting and receiving unit. In the process, parameters acquired with the aid of the sensor unit 25 are transmitted via the sender and receiver (transceiver) unit 241 of the door leaf means 20 to the sender and receiver unit of the door control means.

The signal transmission between the first and second transmitter and receiver unit 241, an example of a communication unit, can take place via a bidirectional radio link. For example, communication/transmission with Bluetooth can take place via the protocols Baseband, L2CAP, or LMP. After identification of the first or second transmitting and receiving unit 241 via the respective 48-bit address, the data transmission takes place via data packets. The RS-232 serial interface or the I2C bus can be used as an interface to the microcontroller units.

As explained above, signal transmission or communication can take place via a unidirectional radio link. Only one receiver unit is provided at the door control means 5, while only one transmitter unit is provided at the door leaf means. Unidirectional data transmission may be sufficient for certain applications. This type of data transmission is also energy-saving compared to bidirectional data transmission, as the door leaf means 20 does not consume any energy for the readiness to receive or for the reception of data.

Several devices can be connected to the door control means 5, such as an opening switch, a remote condition, or other sensors that detect the door opening range. The door control means 5 takes into account the information or operationally relevant parameters received by the other devices and controls the driving means 4 in such a way that it opens or closes the roller shutter 1 in accordance with the desired operating mode.

In addition to this information, the door control means receives 5 further operationally relevant parameters from the door leaf means 20. These operationally relevant parameters are also taken into account by the door control means 5 when controlling the driving means 4.

The connection between door control means 5 and driving means 4 can be made either via cable or wirelessly, for example via radio as shown above. The driving means 4 drives the door leaf 2 depending on the commands received.

If, for example, a locked state of the door leaf means 20 is detected via the sensor unit 25, the second transmitting and receiving unit 241 transmits a signal indicating this state to the first transmitting and receiving unit. The door control means 5 processes this signal and no longer controls driving means 4 as long as the locked state exists.

Figure 3:
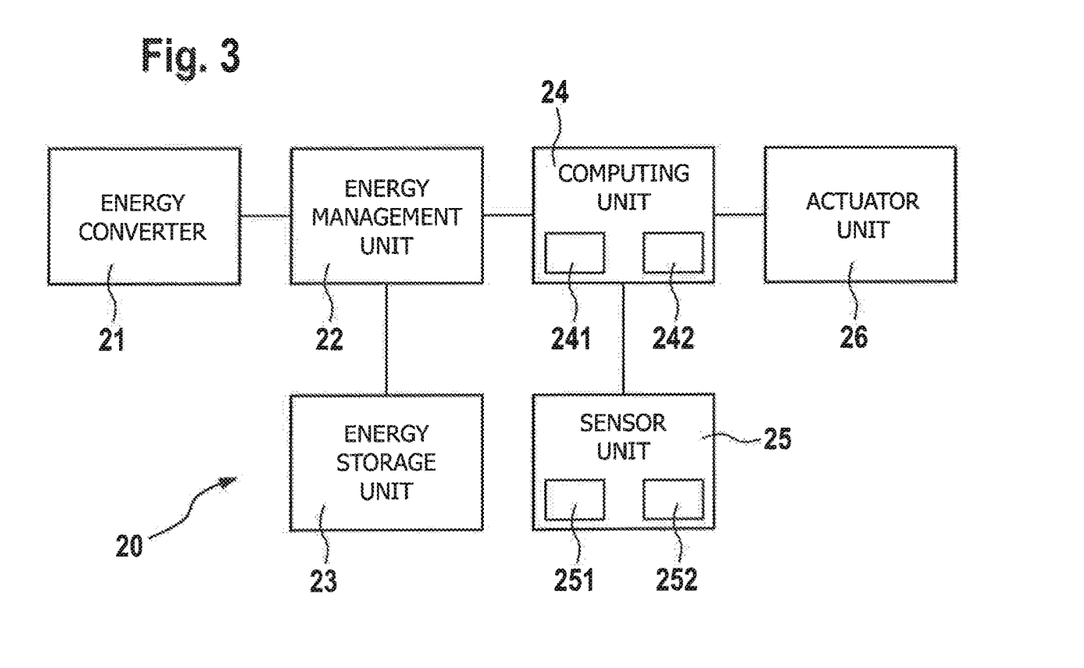
FIG. 3 a principle diagram of assemblies of the electric door leaf means 20 shown in FIG. 1.

FIG. 3 shows a principle diagram of the functional assemblies of the electromechanical door leaf means 20 shown in FIG. 1 and FIG. 2. The door leaf means 20 has an energy converter 21, an energy management unit 22, an energy storage unit 23, an arithmetic unit 24/a computing unit 24 and a sensor unit 25.

For example, the invented energy converter 21 can convert the mechanical energy of door leaf 2 into electrical energy to supply the electrical loads in door leaf means 20. Possible configurations of the energy converter 21 are described in detail below. During an opening and/or closing process, the energy converter 21 can generate sufficient power for at least rudimentary operation of the loads. For example, it is possible to generate some 10 mW power, which is sufficient for the operation of corresponding low-power components. Controlled by the energy management unit 22, the power generated by the energy converter 21 can be used to charge the energy storage unit 23 and/or to supply the consumers.

The inventive energy management unit 22 acts as an interface between energy converter 21, energy storage unit 23 and the other electrical consumers contained in the door leaf means 20. In addition, the energy management unit 22, usually by means of a simple electronic circuit, converts the energy (voltage, current) generated by the energy converter 21 in such a way that it can be stored in the energy storage unit 23 for a longer period of time. For example, a bridge rectifier converts the AC voltage generated by the energy converter 21 into a DC voltage. The energy management unit 22 is designed in such a way that it itself has a high degree of efficiency and consumes little energy.

The energy storage unit 23 is preferably a capacitor with a large capacity (at least several 10 µF), for example a "gold cap" with at least several mF, which serves for the intermediate storage of the electrical energy produced by the energy converter 21. The energy storage unit 23 is connected to the energy management unit 22. Thus, the energy storage unit 23 is intended to make 20 energy available to the consumers of the invented door leaf means at times when the energy converter 21 generates no or too little energy. The energy storage unit 23 preferably has a low self-discharge rate so that the stored energy is also available for longer periods of time and the efficiency of the door leaf means 20 is high.

The electrical loads of the invented door leaf means 20 comprise at least one computing unit 24 and the sensor unit 25. The computing unit 24 has the second transmitting and receiving unit 241 and the signal processing unit 242. The signal processing unit 242 can be implemented via a microcontroller, such as a conventional 8-bit microcontroller, or alternatively via a DSP (Digital Signal Processor). This signal processing unit 242 is preferably designed in "ultra-low-power" technology.

The sensor unit 25 has at least one sensor 251 for measuring a physical quantity and one signal conditioning unit 252. Sensor 251 detects at least one physical parameter such as the outdoor temperature or the locking status of the door leaf 2. The signal conditioning unit 252 can process the electrical signal output from the sensor 251, such as filtering or amplifying it. The analog values can then be converted into digital values via an AD converter for processing in the processing unit 24. If several physical parameters are detected, the signal conditioning unit 252 can multiplex the electrical signals.

Figure 4:
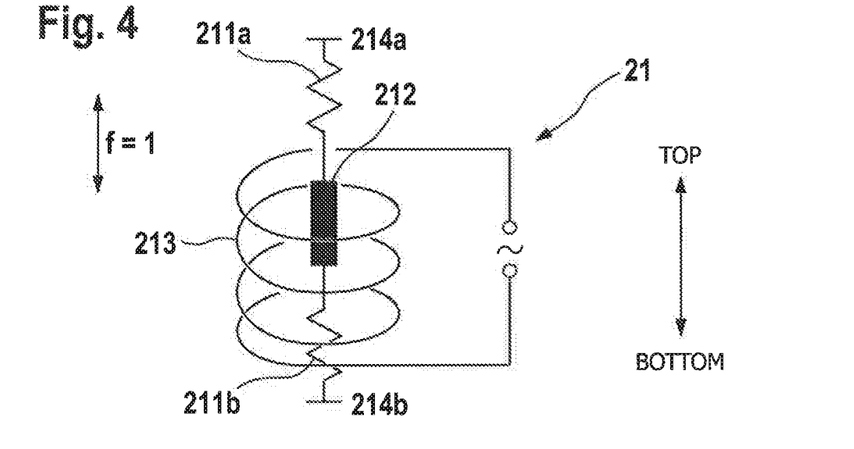
FIG. 4 an energy converter 21 according to one aspect of the invention.
Figure 5:
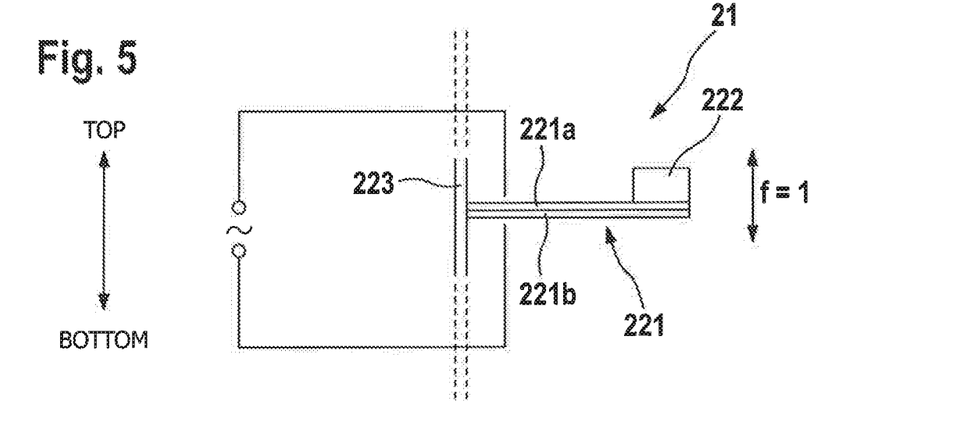
FIG. 5 an energy converter 21 according to another aspect of the invention.

FIG. 4 and FIG. 5 each show a version of an energy converter 21, which converts the mechanical energy of the door leaf 20 into electrical energy.

The energy converter 21 shown in FIG. 4 works with the aid of the induction principle. For this purpose, two opposite springs 211a and 211b are arranged in a cavity in the energy converter 21, both of which can be deflected along their central axes, which run in the same direction. The springs 211a and 211b are firmly connected to the end element 7 by fasteners 214a and 214b.

A magnet 212 is attached to the free movable ends of the springs 211a and 211b. This allows the magnet 212, which is suspended along the central axes of the springs 211a and 211b, to move both in the direction of one spring 211a and in the direction of the other spring 211b. The degree of freedom f of the magnet 212 is f=1. This can be achieved, for example, by a linear guide of the magnet 212 which is not shown in detail or by a two-sided suspension of the magnet 212. The spring constants of the springs 211a and 211b are designed in relation to the mass of the magnet 212 in such a way that they allow an oscillating (damped) oscillation of the magnet 212. If the energy converter 21 is now accelerated in a direction in which the magnet 212 can be deflected, mechanical energy is supplied to the oscillating system consisting of springs 211a, 211b and magnet 212. The oscillating system will continue to oscillate, especially when the acceleration of the energy converter 21 has ended. In order to achieve the greatest possible oscillation of the oscillating system, the directions of the acceleration forces which can act on the energy converter 21 coincide with the directions in which the magnet 212 can be deflected.

The suspension of the magnet 212 according to the invention allows a linear displacement of the same. The movement of the end element 7 over large areas is also a linear movement. Accordingly, the energy converter 21 is arranged in the end element 7 in such a way that the degree of freedom of movement (degree of translational freedom f=1) of the magnet 212 corresponds to the opening and closing directions. This optimizes the efficiency of the energy converter 21.

In addition, a coil 213 is arranged in the energy converter 21 in such a way that the magnet 212 moves along its central axis. Thus the magnet 212 moves at least partially back and forth in the coil 213. When the magnet 212 oscillates, electrical energy is generated by induction, which is made available at the output of the energy converter 21 in the form of an alternating voltage. A particular advantage of the invention-based linear energy converter 21 is that it can be adapted to the quasi-deterministically predictable motion and the associated acceleration forces of the door leaf 2 in such a way that maximum efficiency is achieved and the energy yield is high. It is particularly advantageous if the energy converter 21 is arranged in the end element 7, since the movement of the end element 7, in comparison with other elements of the door leaf 2, runs mainly along a straight line. Thus the inertial forces acting on magnet 212 due to the movement of door leaf 2 are parallel to the forces acting on magnet 212 due to springs 211a and 211b. This alignment of the forces acting on the magnet 212 optimizes the energy transfer to the springs 211a and 211b. This will ultimately lead to efficient energy conversion.

The alternative energy converter 21 shown in FIG. 5 operates according to the piezoelectric principle. A fastening element 223 is arranged in the end element 7. A flexural resonator 221, comprising the two flexural resonator elements 221a and 221b, is attached at one end to this fastening element 223. The flexural resonator 221 is preferably a piezoelectric element, which is known from the state of the art. A mass 222 is attached to the other, free end of the flexural resonator 221. The flexural resonator 221 and the mass 222 are arranged perpendicular to the direction of movement of the door leaf 21 in such a way that the flexural resonator 221 is deflected as effectively as possible when the door leaf 2 accelerates.

If door leaf 2 is opened or closed, the energy converter 21 is accelerated with door leaf 2. The inertia force acting on mass 222 in the opposite direction to the acceleration deflects the flexural resonator 221 and again causes it to oscillate in a damped manner. The flexural resonator 221 thus generates an alternating voltage, which the energy converter 21 makes available at its output.

The flexural resonator 221 according to the invention is arranged perpendicular to the direction of motion of the door leaf 2 in such a way that it reaches its maximum deflection when the door leaf 2 accelerates. The flexural resonator 221 is arranged in such a way that it essentially has only one translational degree of freedom (f=1). Since the flexural resonator 221 is clamped on one side and mass 222 is attached to its free end, this mass 222 can further increase the deflection of the flexural resonator 221. The weight force and the point of application of mass 222 on the flexural resonator 221 as well as the design of the flexural resonator 221 itself, such as length, thickness and modulus of elasticity, are designed in such a way that the electrical voltage generated is maximum.

Figure 6:
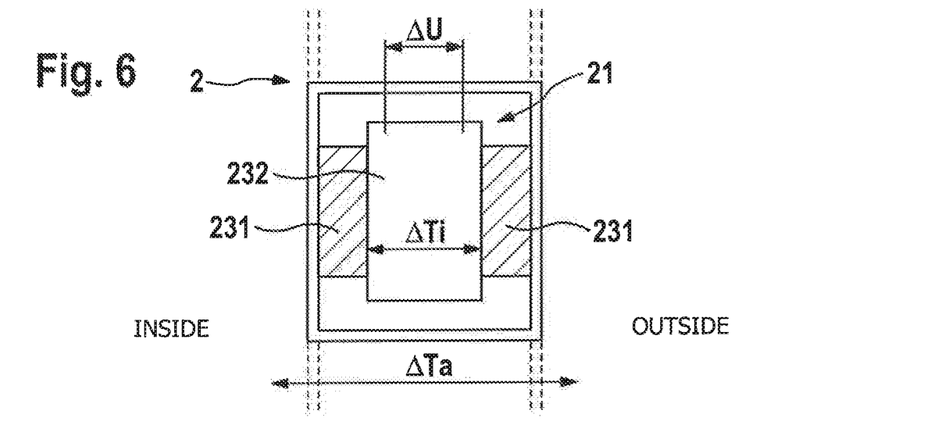
FIG. 6 an energy converter 21 according to another aspect of the invention.

FIG. 6 shows a thermoelectric energy converter 21. The thermoelectric energy converter 21 has thermally conductive intermediate elements 231, preferably plates 231, for electrical insulation and at least one thermocouple 232. The opposite intermediate elements 231 or plates 231 are mounted in a lamella in such a way that the respective plate 231 is thermally connected to the respective side of the lamella of the door leaf so that the plates 231 can each approximately assume the ambient temperature of the first and second door sides respectively. Door leaf 2 usually separates rooms or areas that may regularly have a temperature difference. For example, the first side and the second side of door leaf 2 can each face the inside and outside of a building.

As a result, there is regularly a temperature difference between the inside and outside of the door leaf 2 $\Delta Ta$. For example, the ambient temperature inside the hall may be higher than outside due to the heating of the hall, so that the intermediate elements or panels 231 also have correspondingly different temperatures.

The at least one thermocouple 232 is further arranged between the two plates 231 in such a way that the respective different temperature levels are communicated so that there is a temperature difference $\Delta Ti$ between opposite surfaces of the thermocouple 232. Thermoelectric materials with high ZT values, such as solid solution series of $Bi_2Te_3$ with $Bi_2Se_3$ and $Sb_2Te_3$, are used as materials.

To generate more voltage, several thermocouples 232 can be connected in series. Consequently, a larger area can be used on door leaf 2 which, if required, can extend over the entire width of door leaf 2. Since the voltage generated depends on the temperature difference ($\Delta Ti$) and the number of thermocouples 232, the door leaf 2 is suitable for thermoelectric energy generation because of the specific characteristics described above.

The potentially usable area extends over the entire door leaf 2, allowing a large number of 232 thermocouples to be installed or large thermocouples to be used.

The location of the door leaf 2 itself is also particularly suitable for the use of thermoelectric energy converters 21 due to its specific application as a separating element between different rooms, which usually have different temperature levels. The thermoelectric energy converter 21 can thus effectively charge the energy storage element 23 and supply the electrical consumers of the door leaf means 20 with electrical energy.

The invention permits further design principles in addition to the forms of execution and aspects explained. Thus, individual features of the various design forms and aspects can also be combined with each other as desired, as long as this is evident to the expert as feasible.

For example, the different sensor arrangements/principles described above can be combined with each other. The invention-based door leaf means can, for example, have a collision sensor and a number of temperature sensors.

The energy converter, for example, can also have a linear generator and a thermocouple, so that the various principles of energy conversion described above can be combined.

Alternatively, other mechanics can also be used for the electromechanical energy converter. For example, a dynamo with one axis and with a mass excentrically attached to the axis can also be used.

The door according to the invention, which was explained above with the example of a rolling door, can also be a folding door or a hinged door. Thus, according to the invention, all doors are covered in which door leaves experience a defined movement or a predetermined path.

In addition, the door leaf means does not have to be located in the (lower) end element of the door leaf. This means that the door leaf means can also be located at any other point on the door leaf, for example in the middle.

In principle, the door leaf means can also have other assemblies (not shown in FIG. 3), such as low energy consumption display elements.

The door leaf shown in FIG. 1 can move from bottom to top and vice versa. However, according to invention, also doors are included, whose door leaves can move into other directions, e.g. sideward.

The invention claimed is:
1. A door comprising:
    a door leaf which is guided by lateral guides, and which covers a door opening, and which has a first and a second side;
    a driver for moving the door leaf between an opened and a closed position;
    a controller for driving the driver, the controller comprising a first communication unit; and
    an electrically self-sufficient door leaf device arranged in the door leaf, comprising:
        at least one sensor unit for detecting at least one physical quantity;
        an energy converter which converts mechanical energy, which is available due to movement of the door leaf, into electrical energy;
        a second communication unit, the first and second communication units communicating wirelessly with each other; and
        at least one actuator unit.
2. The door according to claim 1, wherein
    the door leaf has an interlock, and
    the at least one sensor unit has a locking sensor which detects a locking state of the interlock, and wherein
    the door leaf device transmits the locking state of the interlock to the controller, and the controller prohibits the drive, when the door leaf is locked.
3. The door according to claim 2, wherein
    the interlock is a mechanical device or an electrical device.
4. The door according to claim 1, wherein
    the energy converter has a mechanical energy storage element and a vibratory mass attached thereto, whereby the energy converter converts acceleration movements of the door leaf into damped oscillating oscillations of the vibratory mass.
5. The door according to claim 1, wherein
    the energy converter is configured such that it is based on an induction principle or on a piezoelectric principle.
6. The door according to claim 1, wherein
    the energy converter is a linear generator, and is a degree of freedom of the vibratory mass of the energy converter f=1, and the degree of freedom of the vibratory mass is provided such that it coincides with essential directions of acceleration of an end element of the door leaf.

7. The door according to claim 1, wherein
the energy converter is a thermal/voltage converter arranged to use a temperature difference between the first and second sides of the door leaf to generate electrical energy for the door leaf device.

8. The door according to claim 1, wherein
the door leaf has an end element, and
the at least one sensor unit has a collision sensor which is arranged in the end element.

9. The door according to claim 1, wherein
the at least one sensor unit has temperature sensors which detect a temperature difference between the first and the second side of the door leaf, and/or external temperature sensors and/or acceleration sensors for detecting a direction of movement of the door leaf and its acceleration.

10. The door according to claim 1, wherein
the at least one sensor unit has temperature sensors, wherein
a measured temperature difference is transmitted from the door leaf device to the controller, which thereby evaluates a tightness of the door.

11. The door according to claim 1, wherein
the at least one sensor unit has at least one outside temperature sensor, wherein
a measured outdoor temperature is transmitted by the door leaf device to the controller, which switches between summer and winter operation by means of a comparison of a preset threshold value with the measured outdoor temperature, and wherein
the door is not completely closed in its closed position during the summer operation.

12. The door according to claim 1, wherein
the at least one sensor unit has at least one acceleration sensor, and
values measured by the acceleration sensor are transmitted by the door leaf device to the controller, the controller judging whether the door is damaged or worn by comparing the values with at least one preset first acceleration threshold value.

13. The door according to claim 1, wherein
the sensor unit comprises at least one acceleration sensor, and
values measured by the acceleration sensor are transmitted by the door leaf device to the controller, wherein the controller assesses by comparing the values with at least one preset second acceleration threshold value whether inadmissible user settings have been made for the door.

14. The door according to claim 1, the door leaf device further comprising at least one of:
an energy storage unit for storing the electrical energy generated by the energy converter;
an energy management unit for managing the energy generated by the energy converter; and
a computing unit, wherein
the computing unit has a signal processing unit and/or an actuator unit.

15. The door according to claim 1, wherein:
the door leaf device has the energy converter, the energy management unit, the energy storage unit, the computing unit, the sensor unit and the at least one actuator unit and forms an energetically self-sufficient system unit, the converted and stored energy being used to supply energy to these components, an external energy supply to the door leaf device not being required.

16. The door according to claim 1, wherein:
the door leaf device forms an integrated assembly; and/or
the door leaf device is arranged in an end element of the door leaf.

17. A method, comprising:
converting mechanical energy available due to movement of a door leaf into electrical energy using an energy converter of a door leaf device arranged in the door leaf of a door;
storing the electrical energy in an energy storage unit of the door leaf device;
detecting at least one physical quantity using at least one sensor unit of the door leaf device; and
transmitting the detected physical quantity using a communication unit of the door leaf device to a stationary controller which is provided for controlling a driver of the door;
where the transmission is wireless, and wherein
the step of detecting and the step of transmitting take place using the stored electrical energy.

18. The method according to claim 17, wherein
the detected physical quantity is at least a temperature at the door leaf and/or an acceleration of the door leaf.

19. A method, comprising:
converting mechanical energy, which is available due to movement of a door leaf, into electrical energy using an energy converter for supplying energy to an electrically self-sufficient door leaf device which is arranged in the door leaf of a door and has at least one sensor unit for detecting at least one physical quantity.

* * * * *